July 7, 1936.    J. G. LUCAS    2,046,566
METHOD OF AND MEANS FOR PRESERVING THE SEDIMENT TEST OF A FLUID
Filed Jan. 16, 1935

INVENTOR.
J. G. Lucas
BY
M. Talbert Dick
ATTORNEY.

Patented July 7, 1936

2,046,566

UNITED STATES PATENT OFFICE 2,046,566

METHOD OF AND MEANS FOR PRESERVING THE SEDIMENT TEST OF A FLUID

Junious G. Lucas, Madrid, Iowa

Application January 16, 1935, Serial No. 2,057

2 Claims. (Cl. 35—20)

The principal object of my invention is to provide a means for preserving for record the actual sediment or lack of sediment obtained from a sediment test of a quantity of cream; said means being of such nature that the sediment test may be given or sent to the dairyman supplying the cream.

A further object of this invention is to provide a means for preserving for record the foreign matter test of a quantity of cream that permits the inspection and study of the test by visual observation.

A still further object of my invention is to provide a method of and means for preserving the sediment test of a quantity of cream that is economical, conclusive as to test, and sanitary.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawing, in which:

Figure 1:
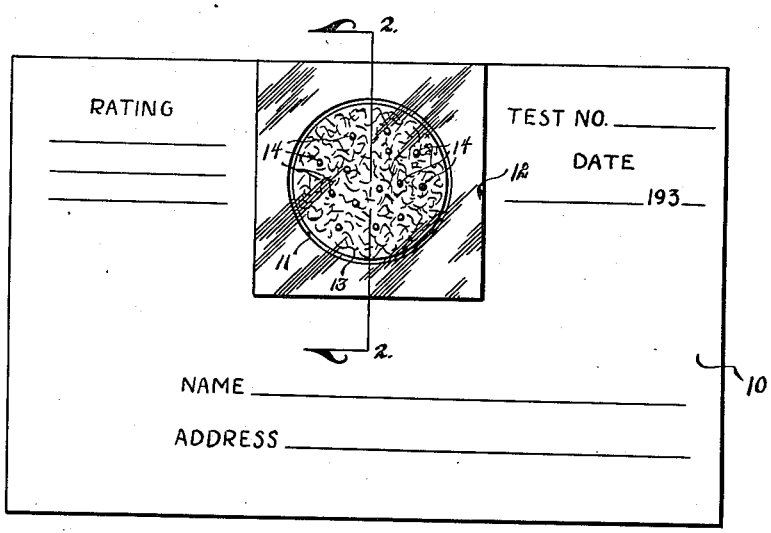
Fig. 1 is a front view of my complete means for preserving for record the sediment test of cream or like and illustrates how the retained sediment may be visibly inspected to ascertain its amount or nature.

The usual method of taking sediment tests of milk, cream, and like is to pass a quantity of the fluid through a common filter disc. The pure product will naturally strain through the disc, but all undesirable foreign matter will be retained on the upper surface of the filter disc, where it may be easily studied and noted. Because of government requirements, such tests of dairy products are common practice and are comparatively easily made. A difficulty, however, arises in preserving such a test and getting it into the possession of others such as the dairyman furnishing the cream or milk. It is to overcome this latter difficulty that I have provided the device which I will now describe in detail.

Referring to the drawing, I have used the numeral 10 to designate a sheet member. This sheet member is made of cardboard or similar suitable material and has a window opening 11. Suitable indicia may be printed on the sheet 10 and blank spaces provided for rating the test, designating the product tested, noting the date, name, and address of the individual or firm furnishing the product.

Figures 2, 3:
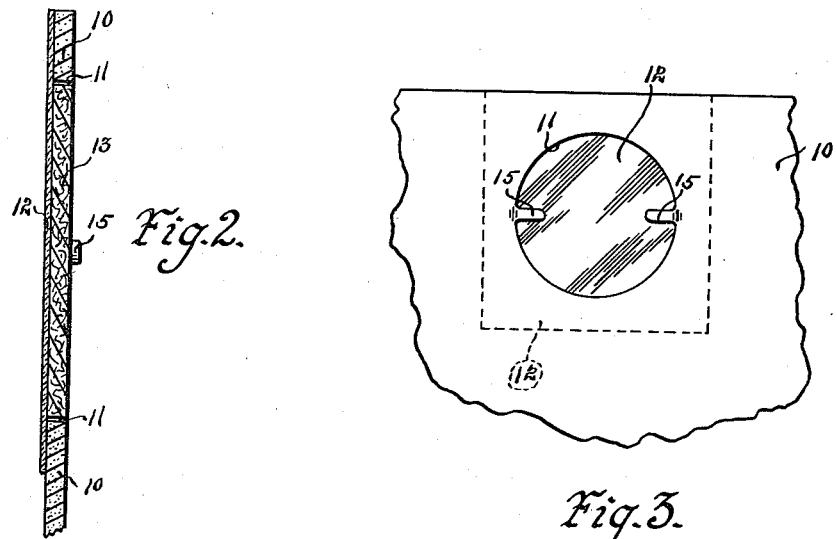
Fig. 2 is a cross-sectional view of my device and is taken on line 2—2 of Fig. 1.
Fig. 3 is a back view of the window portion of the device before the filter disc is placed therein.
Figure 4:
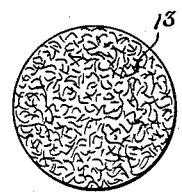
Fig. 4 is a plan view of one of the filter discs before use.

The numeral 12 designates a sheeting of transparent material pasted on one side of the card 10 and over the window opening 11, as shown in Fig. 2. This transparent patch 12 may be of any suitable material, but preferably of flexible waterproof material. The numeral 13 designates the ordinary filter disc made of suitable material such as cotton, felt, fiber, or like.

The practical operation of my method is as follows: A sample of the cream or like to be tested is strained in one direction through the disc 13. If there be any sediment or foreign matter in the sample it will lodge on the upper surface of the disc and be easily noted. If there be no sediment in the sample the upper surface of the disc will show clear. The disc is then placed in the window opening 11 from the rear side of the card 10, with its upper surface adjacent the transparent material 12. As the pad filter disc is moist when placed in the window it will adhere and stick to the transparent member 12 and thereby be retained in the window of the card. By looking through the transparent sheet 12 the sediment may be easily seen. If desired, the card 10 may be held between the eyes of the observer and a source of light and all particles retained, although they may have somewhat penetrated the disc 13, may be easily observed. In Fig. 1, I use the numeral 14 to designate sediment lodged on and in the disc 13. After the card 10 has been properly filled out it is placed in an envelope or like and mailed or given to the interested party such as the dairyman.

Although I have described my invention as particularly adapted to the dairy industry, it is obvious that it can be used to equal advantage in other fields.

If it is desired, ears 15 may be provided on the inner marginal edge of the opening 11 to act as lugs for holding the disc 13 in place. When the disc is placed in the opening 11, these ears are bent outwardly and around the marginal edge of the disc, as shown in Fig. 2.

Some changes may be made in my method of and means for preserving the sediment test of a fluid without departing from the real spirit and purpose of my invention and it is my intention to cover by my claims any modified forms of structure or method which may be reasonably included within their scope.

I claim:

1. The method of preserving the sediment test of a fluid, consisting in previously preparing a card member with an opening and a transparent waterproof sheet element over one side of the opening, straining the fluid to be tested through a filter element having a thickness substantially that of the thickness of said card member, and placing the filter element in the opening of said card member and adjacent said transparent sheet element with the side of the filter element bearing the sediment adjacent the transparent sheet element while said filter element is still moist from the fluid tested.

2. In a device for preparing and preserving the sediment test of a fluid, a flat card member having an opening, a transparent water-proof sheeting secured to one side of said card member and over said opening, and a filter disc having a thickness substantially that of the thickness of said card member designed to normally rest in the opening of said sheet member.

JUNIOUS G. LUCAS.